United States Patent [19]

Sugita et al.

[11] Patent Number: 5,063,322

[45] Date of Patent: Nov. 5, 1991

[54] FEED MECHANISM WITH A SLIDING MEMBER GUIDED BY A HYDROSTATIC BEARING

[75] Inventors: Kazuhiko Sugita, Anjo; Nohumitsu Hori, Ichinomiya; Yasumasa Nakane, Takahama, all of Japan

[73] Assignee: Toyoda Koki Kabushiki Kaisha, Kariya, Japan

[21] Appl. No.: 572,256

[22] Filed: Aug. 27, 1990

[30] Foreign Application Priority Data

Aug. 30, 1989 [JP] Japan ................................. 1-221819

[51] Int. Cl.$^5$ ...................... H01L 41/08; F16C 17/00
[52] U.S. Cl. .................................... 310/341; 310/342; 310/344; 384/100; 384/120
[58] Field of Search ....................... 310/341, 342, 344; 384/12, 100, 13, 120

[56] References Cited

U.S. PATENT DOCUMENTS

| | | | |
|---|---|---|---|
| 3,058,559 | 10/1962 | Ohraberger | 384/100 |
| 3,432,213 | 3/1969 | Adams | 384/12 |
| 3,508,430 | 4/1970 | Edmondson | 384/12 |
| 3,658,393 | 4/1972 | Luthi | 384/100 |
| 3,781,070 | 12/1973 | Uhtenwoldt et al. | 384/12 |
| 3,899,222 | 8/1975 | Mendelevsky et al. | 384/12 |
| 4,630,942 | 12/1986 | Tsumaki et al. | 284/12 |
| 4,648,724 | 3/1987 | Sugiyami et al. | 384/12 |
| 4,865,465 | 9/1989 | Sugita et al. | 381/12 |

FOREIGN PATENT DOCUMENTS

| | | | |
|---|---|---|---|
| 2149391 | 5/1972 | Fed. Rep. of Germany | 384/100 |
| 2456032 | 6/1975 | Fed. Rep. of Germany | 384/100 |
| 1070452 | 12/1989 | Fed. Rep. of Germany | 384/12 |
| 0013120 | 1/1984 | Japan | 384/12 |
| 0138916 | 6/1986 | Japan | 384/12 |
| 0769502 | 10/1980 | U.S.S.R. | 384/100 |
| 1186851 | 10/1985 | U.S.S.R. | 384/12 |
| 0642941 | 9/1950 | United Kingdom | 384/12 |
| 0726018 | 3/1965 | United Kingdom | 384/12 |

*Primary Examiner*—Mark O. Budd
*Assistant Examiner*—Thomas M. Dougherty
*Attorney, Agent, or Firm*—Oblon, Spivak, McClelland, Maier & Neustadt

[57] ABSTRACT

A feed mechanism is constructed with a piezoelectric actuator embedded in the front end of a square sliding shaft, which is supported by hydrostatic guide surfaces formed on a guide base for sliding motion in the axial direction. A cooling jacket having a helical channel on its outside surface is provided at the periphery of the piezoelectric actuator. A part of pressurized fluid fed to the hydrostatic guide surfaces is led to the helical channel of the cooling jacket through a cooling oil feeding channel formed in the sliding shaft, and fluid in the helical channel is drained to a low pressure space through an oil discharging channel formed in the sliding shaft.

6 Claims, 4 Drawing Sheets

FEED MECHANISM WITH A SLIDING MEMBER GUIDED BY A HYDROSTATIC BEARING

BACKGROUND OF THE INVENTION

1. Field of the Invention

The present invention relates to a feed mechanism to move a movable member using a sliding member which is supported by a hydrostatic bearing.

2. Discussion of the Prior Art:

In a machining apparatus for machining a workpiece into a non-circular shape, it is possible to use the feed mechanism, as shown in FIG. 5, for moving a tool. To be more specific, a cutting tool holder 3 with a cutting tool 2 is mounted on a front end of a square sliding shaft 1 through a piezoelectric actuator 4. The square sliding shaft 1 is held to be slidable in an axial direction by the force of oil which is fed to a hydrostatic bearing 6 formed between a guide base 5 and the square sliding shaft 1. In this arrangement, the square sliding shaft 1 is moved by a linear motor (not shown). With the synthesis of the driving motions by this linear motor and the piezoelectric actuator 4, the cutting tool 2 is moved in the direction perpendicularly crossing the rotational axis of the workpiece. The workpiece is thus machined in a non-circular shape.

Oil is fed to the hydrostatic bearing 6 as follows. First, oil stored in a tank 8 is pumped up with a hydraulic pressure pump 9, and pressurized oil discharged from the hydraulic pressure pump 9 lowers its pressure to a certain pressure level by means of a hydrostatic pressure reducing valve 10. The oil thus held at the reduced pressure is fed to the hydrostatic bearing 6 through an oil inlet channel 7 provided in the guide base 5. The oil thus fed into the hydrostatic bearing 6 is further led into an annular discharging channel 11 after being passed through the gap between the square sliding shaft 1 and the guide base 5. The oil is then fed back from the annular discharging channel 11 into the tank 8. In this regard, the reference numeral 8a represents an oil temperature controller, and the reference numeral 17 is a diaphragm which supports the cutting tool holder 3.

Moreover, the piezoelectric actuator 4, which is embedded in the front end of the square sliding 1, expands in accordance with the magnitude of the voltage applied to the actuator 4, thereby making the cutting tool holder 3 move minutely. Since the piezoelectric actuator 4 generates heat as the result of expansion movements, it is necessary to cool off the piezoelectric actuator 4. For the purpose of cooling this piezoelectric actuator 4, a cooling jacket 12 is provided, as shown in FIG. 5, at the outer circumferential area of the piezoelectric actuator 4. On its outer circumferential surface, the cooling jacket 12 is further provided with a helical oil channel 13 which communicates with the oil channels 3a and 13b formed within the square sliding shaft 1. Furthermore, a cooling oil feeding pipe 15a connects a hydraulic pressure pump 9 and a fixed connecting part 14. The connecting part 14 is communicated with the outer end of one oil channel 13a in the square sliding shaft 1 by means of a flexible hose 15. Likewise, the oil discharging pipe 16a, which connects the fixed connecting part 14 and the tank 8, is communicated with the outer end of the other oil channel 13b with a flexible hose 16.

In this case, elasticity of the hoses 15 and 16 cause resistance to the movement of the square sliding shaft 1, resulting in deterioration in the positioning accuracy of the square sliding shaft 1.

Moreover, the conventional structure had a problem that the piping system tends to be complicated, because many oil pipes are required to connect the cooling jacket 12 with the pump 9 and tank 8.

SUMMARY OF THE INVENTION

Therefore, the primary object of the present invention is to offer a feed mechanism which is capable of cooling an additional actuator provided within the sliding member, without deteriorating the positioning accuracy.

Another object of the present invention is to offer a feed mechanism capable of cooling the additional actuator by utilizing a fluid fed into the hydrostatic bearing which is to support the sliding member.

In short, the present invention proposes a feed mechanism wherein a sliding member is supported to be slidable in the axial direction under the force of oil fed into the hydrostatic bearing formed between the sliding member and the guide base. The feed mechanism comprises an additional actuator which is embedded into the sliding member, together with a cooling jacket provided with an oil channel thereon. The sliding member is provided with a cooling oil feeding channel communicating the hydrostatic bearing with the oil channel of the cooling jacket. It is further provided with a cooling oil discharging channel which communicates the oil channel with the low pressure side in the mechanism.

With the construction described hereinabove, some amount of oil fed to the hydrostatic bearing is led into an oil channel of the cooling jacket via a cooling oil feeding channel provided to the sliding member. With the oil thus fed, the additional actuator is cooled efficiently.

BRIEF DESCRIPTION OF THE ACCOMPANYING DRAWINGS

Various other objects, features, and many of attendant advantages of the present invention will be readily appreciated as the same becomes better understood by reference to the following detailed description of the preferred embodiment when considered in connection with the accompanying drawings, in which.

DETAILED DESCRIPTION OF THE PREFERRED EMBODIMENT

Figure 1:
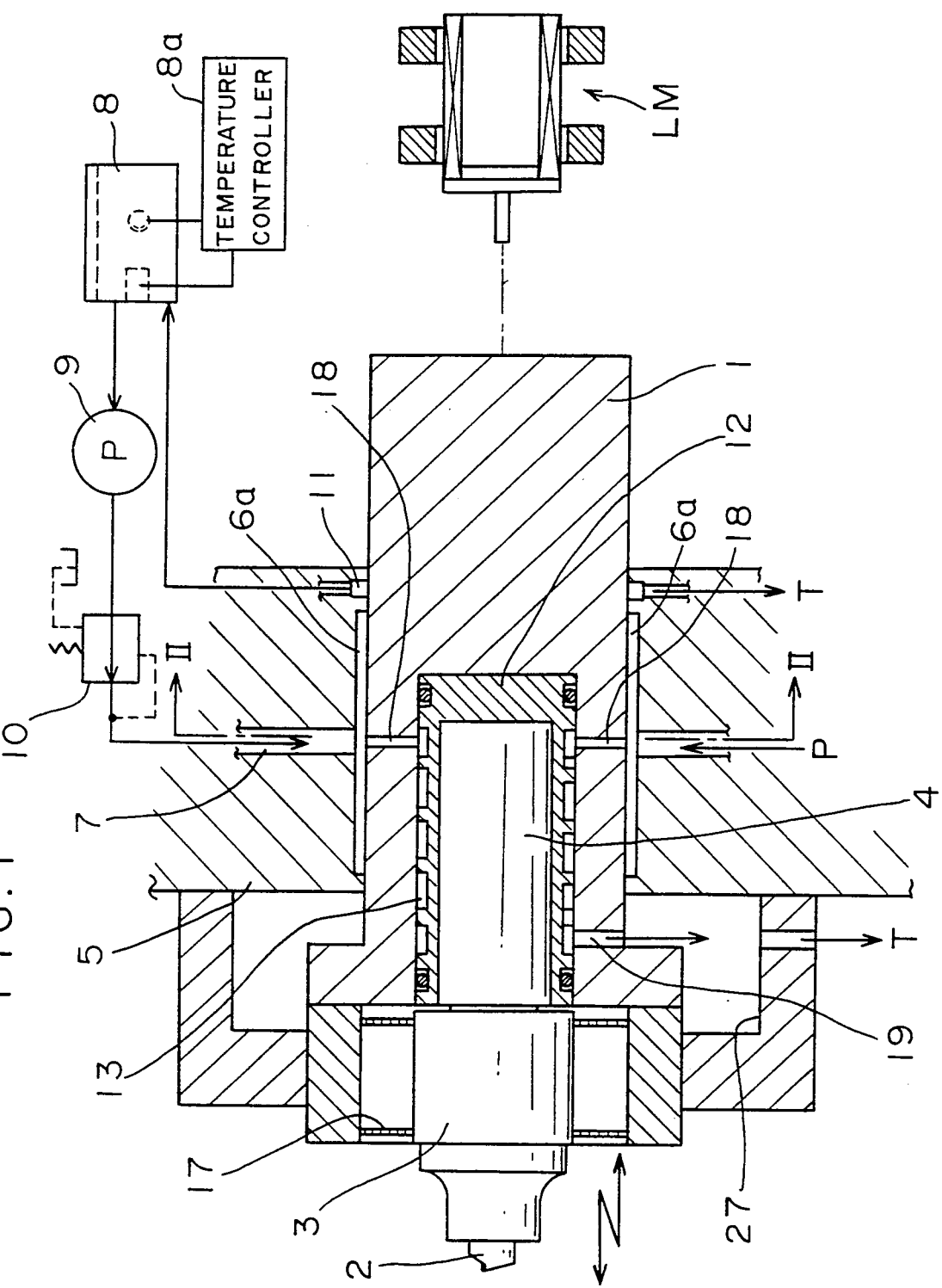
FIG. 1 is a sectional view of the feed mechanism in accordance with one example of the present invention.

Now, a detailed description is made as to an example of the present invention with reference to the accompanying drawings. In FIG. 1, the reference numeral 1 is a square sliding shaft. At its front end, a cylindrical piezoelectric actuator 4 is embedded as an additional actuator together with a cooling jacket 12. Namely, the piezoelectric actuator 4 is fitted into a cylindrical inside bore of the cooling jacket 12, which is fitted into a bore formed at the front end of the square sliding unit 1. On the outer circumference of the cooling jacket 12, an oil channel 13 is formed in a helical form. A pair of seal rings are provided in annular grooves formed at both axial ends of the outer surface of the cooling jacket 12, so that a sealed oil channel is formed by said oil channel 13 and the cylindrical surface portion of the bore formed in the square sliding member 1. The reference numeral 3 is a cutting tool holder, which is finely moved both to left and right by the piezoelectric actuator 4. A cutting tool 2 is inserted in the top end of this cutting tool holder 3. The reference numeral 17 is a diaphragm which supports the cutting tool holder 3 in such a manner as to permit its axial movement.

Figure 2:
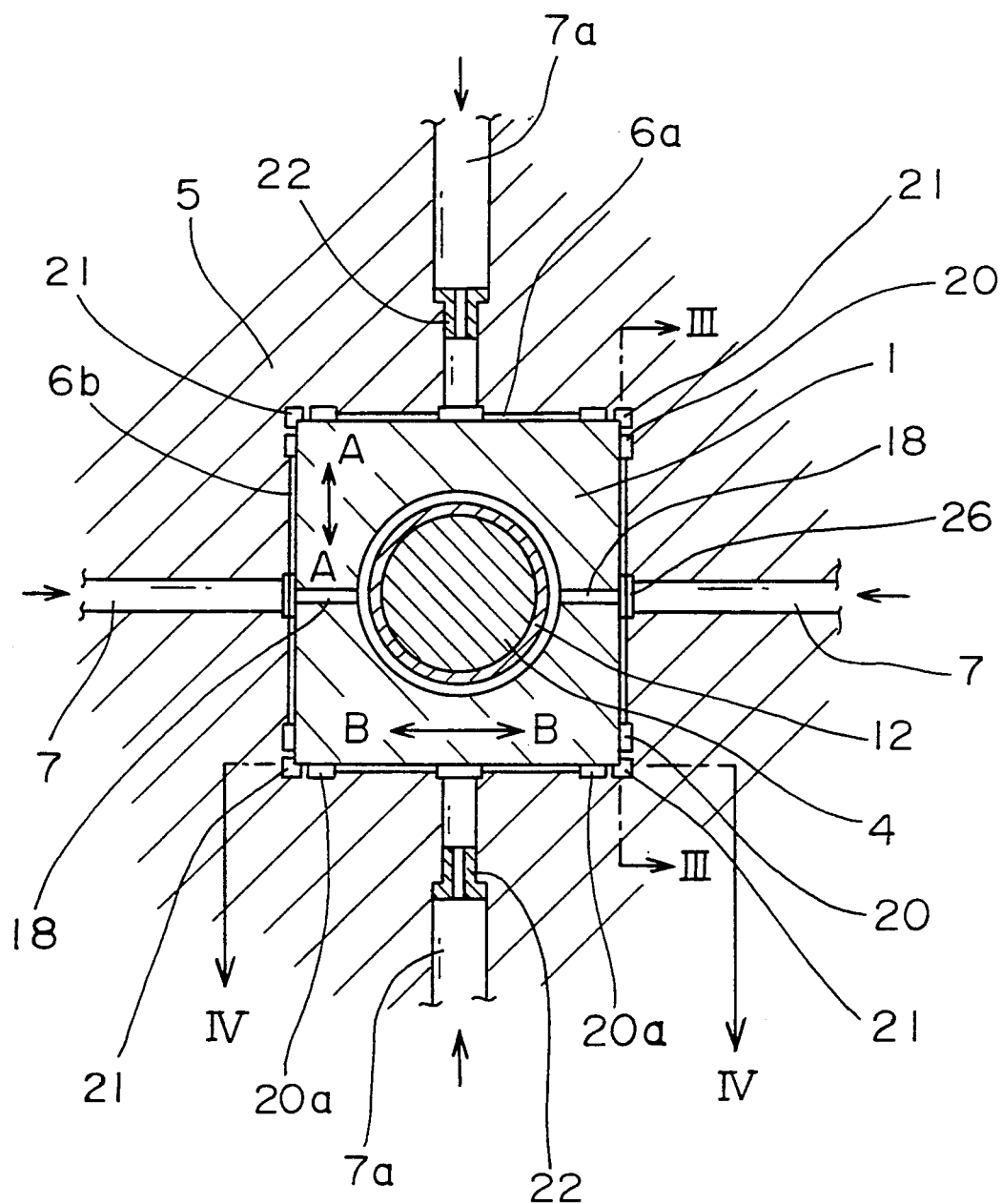
FIG. 2 is a sectional view of the feed mechanism, taken along the line II—II in FIG. 1.
Figure 3:
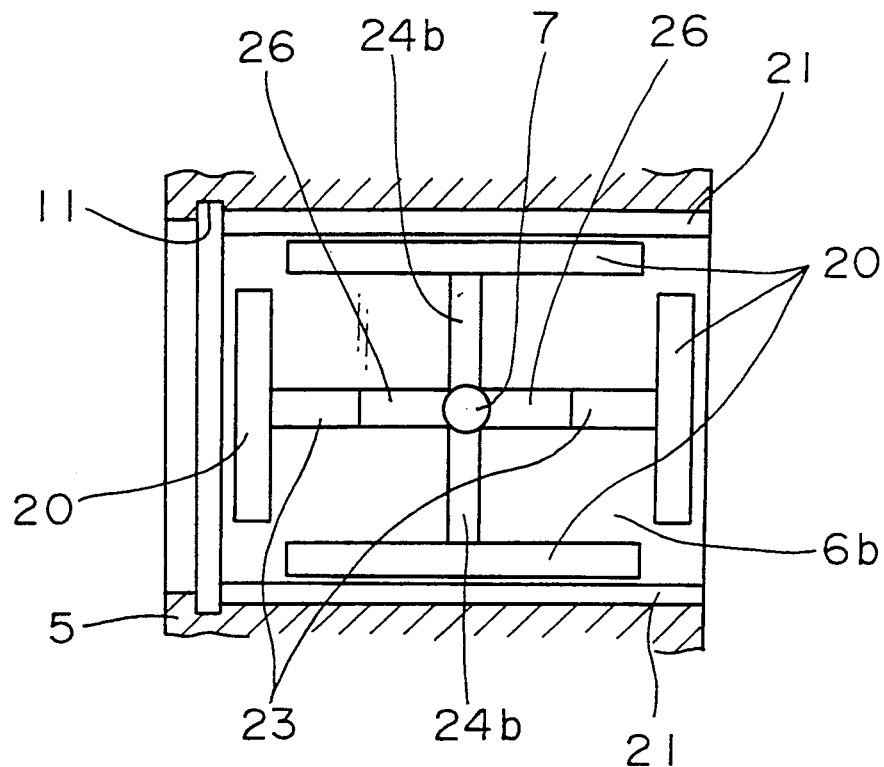
FIG. 3 is a sectional view of the feed mechanism, taken along the line III—III in FIG. 2.
Figure 4:
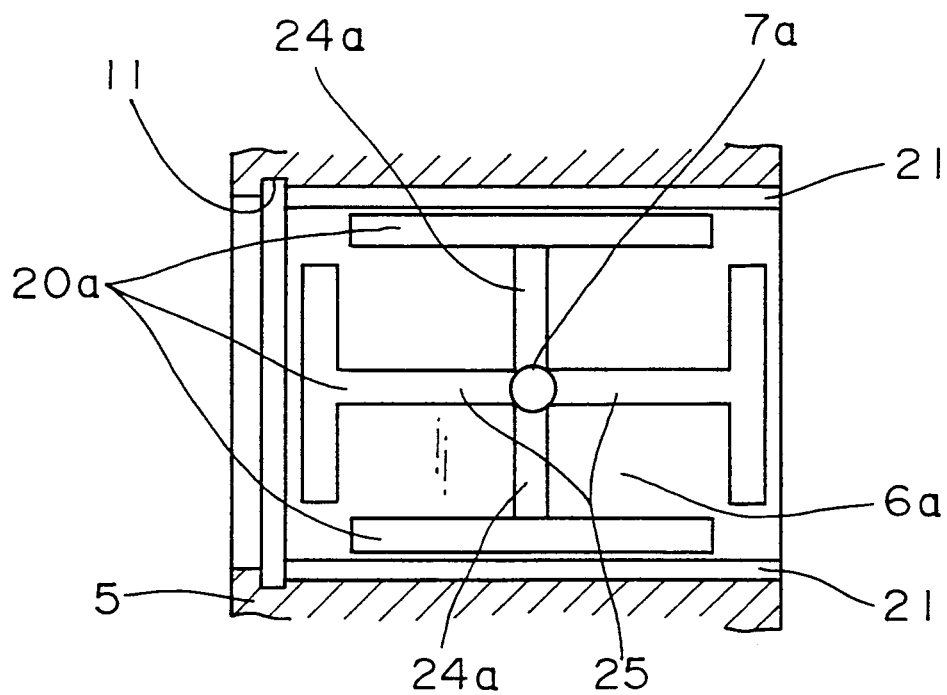
FIG. 4 is a sectional view of the feed mechanism, taken along the line IV—IV in FIG. 2.
Figure 5:
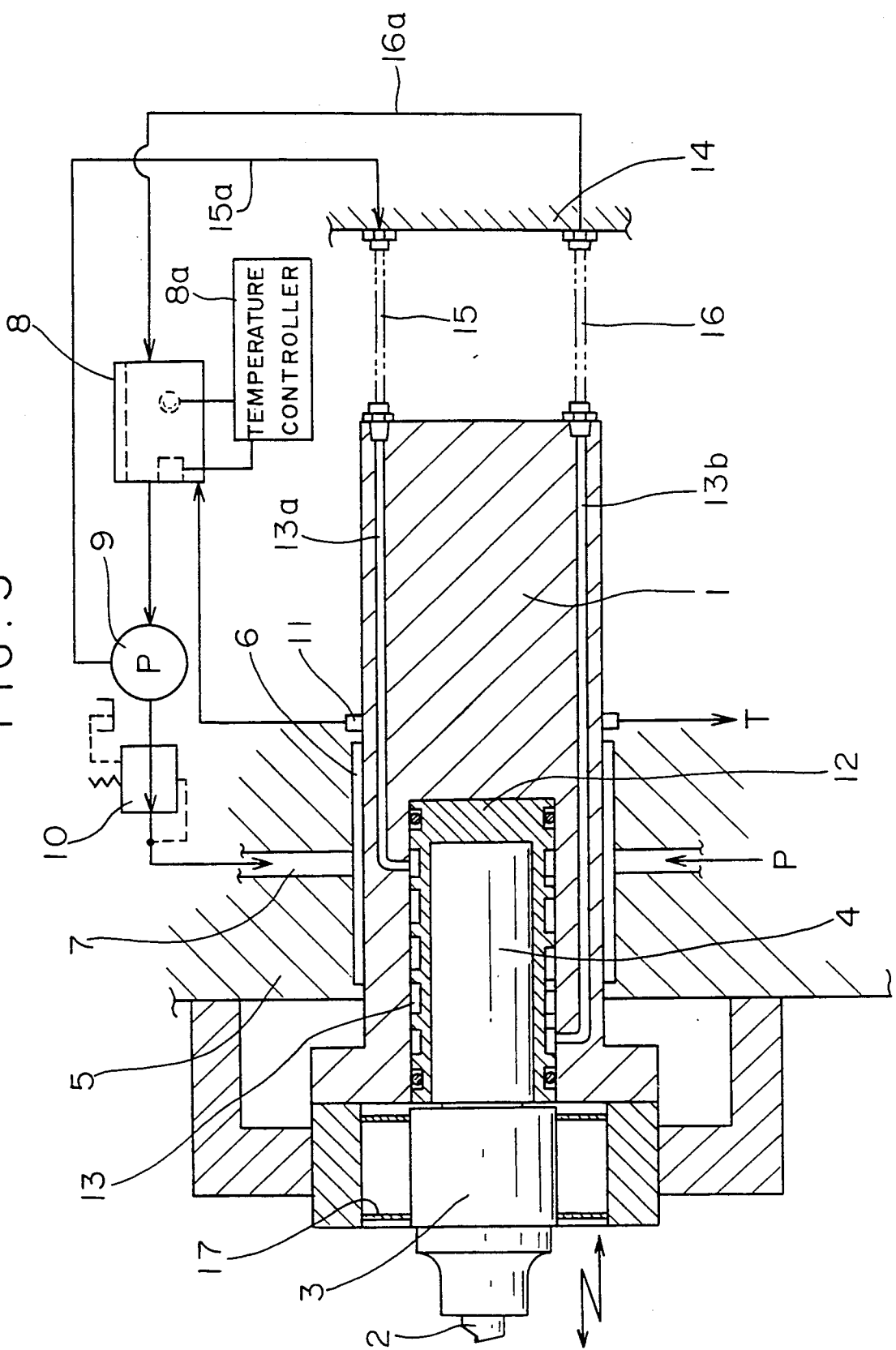
FIG. 5 is a sectional view of a feed mechanism wherein hoses are used for the feeding of cooling oil.

The square sliding shaft 1 is supported on a guide base 5 by a hydrostatic bearing construction so as to be slidable in the axial direction, and is axially moved by a linear motor LM. This hydrostatic bearing construction is illustrated in FIG. 2, FIG. 3, and FIG. 4. On the guide base 5 formed are a pair of hydrostatic guide surfaces 6a and a pair of hydrostatic guide surfaces 6b. The former confine the movement of the square sliding shaft 1 in the upward-downward direction, as shown in FIG. 2, and the latter confine the movement of the square sliding shaft 1 in the leftward-rightward direction. These hydrostatic guide surfaces 6a and 6b form a guide hole with a square section. A plurality of hydraulic pressure pockets 20 and 20a are formed on each of the hydrostatic guide surfaces 6a and 6b, and also formed thereon are throttle channels 23, 24a, and 24b, as well as an interconnecting channels 25, which lead the hydraulic fluid fed via oil inlet channels 7 and 7a into the hydraulic pressure pockets 20 and 20a. The throttle channels 23, 24a, and 24b have a small depth to function as throttles while the interconnecting channels 25 have a large depth and do not function as throttles. Between a pair of throttle channels 23 extending in the sliding direction of the square sliding shaft 1 and the oil inlet channel 7 provided on the hydrostatic bearing surface 6b, there are a pair of deep channels 26 formed in a considerable depth but without any throttling effect. The total length of this deep groove channels 26 is larger by a prescribed amount than the moving stroke of the square sliding shaft 1. Additionally, each of the guide surfaces 6a and 6b is provided with a discharging channel 21 and an annular discharging channel 11, which forms an interconnecting passage together with the discharging channel 21. With the construction described above, the hydrostatic guide surfaces 6a and 6b operate as hydrostatic bearings having surface throttle function.

The hydraulic fluid stored in a tank 8 is pumped up by a hydraulic pressure pump 9. The pressurized oil which is discharged from the hydraulic pressure pump 9 has its pressure reduced to a certain prescribed pressure level by a pressure reducing valve 10 to lead into the oil inlet channels 7 and 7a.

Moreover, each of the oil inlet channels 7a is provided with a throttle (nozzle) 22. The pressure inside the pocket 20a is regulated in an adequate manner by this throttle 22, so that the supporting rigidity of the square sliding shaft 1 in the direction A—A in FIG. 2 can be maintained at a predetermined value. On the other hand, the oil inlet channels 7 are not provided with any throttles as those installed in the oil inlet channels 7a, lest such throttles should hamper smoothness in the flow of the hydraulic fluid (that is, the cooling oil) from the oil inlet channels 7. However, the diameter of cooling oil feeding channels 18, which are described later, is made smaller than that of the oil inlet channels 7a to function as throttles. In each of the hydrostatic guide surfaces 6a shown in FIG. 4, the left and right hydrostatic pressure pockets 20a and the oil inlet channels 7a are connected via the channel 25 without throttling effect. On the other hand, in each of the hydrostatic guide surfaces 6b shown in FIG. 3, the hydrostatic pressure pockets 20 on the left side and the right side and the oil inlet channels 7 are connected each other via the channels 23 which have throttling effect. Therefore, it is possible to generate an adequate level of pressure inside the hydrostatic pressure pocket 20, even if the inlet channels 7 are not provided with any throttles, and thereby to secure a predetermined supporting rigidity in the direction of B—B.

The annular discharging channel 11 is connected with the tank 8, so that the oil fed to the hydrostatic guide surfaces 6a and 6b is fed back to the tank 8 via the discharging channel 21 and the annular discharging channel 11. The reference numeral 8a is an oil temperature controller.

Furthermore, the square sliding shaft 1 is provided with cooling oil feeding channels 18 which communicate the hydrostatic guide surfaces 6b with the oil channel 13 of the cooling jacket 12. It is also provided with a cooling oil discharging channel 19 which communicates the oil channel 13 with the oil recovering chamber 27 connected with the tank 8. It is desirable in this regard that the cooling oil feeding channels 18 are formed at a predetermined axial position corresponding to one end of oil channel 13, and that the cooling oil discharging channel 19 is formed at a predetermined axial position corresponding to the other end of the oil channel 13. The outer ends of the cooling oil feeding channels 18 face the openings of the oil inlet channels 7 when the square sliding member 1 is located its mid position in the axial direction. As a result, the outer ends of the cooling oil feed channels 18 face the oil inlets 7 or a deep groove channels 26 during movement of the square sliding shaft 1.

Next, a description is make on the feeding and discharging of the hydraulic fluid in the feed mechanism. When pressurized oil is fed from the oil inlet channels 7 and 7a into the hydrostatic guide surfaces 6a and 6b, pressure at a prescribed level is generated within the hydraulic pressure pockets 20 and 20a. Then, the square sliding shaft 1 is supported so as to be slidable in the axial direction. In this state, the square sliding shaft 1 is moved by the linear motor LM in the axial direction.

While this square sliding shaft 1 is moved in the axial direction, the cooling oil feeding channels 18 keep their connection with the oil inlet channels 7 or with the deep groove channels 26. Therefore, some part of the oil fed into the hydrostatic guide surface 6b is led into the oil channel 13 of the cooling jacket 12 by way of the cooling oil feeding channels 18 and cools off the piezoelectric actuator 4. The oil led into the oil channel 13 is then discharged through the cooling oil discharging channel 19 and fed back to the tank 8.

As described hereinabove, this invention has a structure wherein some amount of oil fed to the hydrostatic guide surfaces is led into the cooling jacket through the cooling oil feeding channel. This structure eliminates attachments of any hoses between the square sliding shaft and a fixed part for feeding cooling oil to the square sliding shaft. Therefore, the square sliding shaft is free from resistance otherwise caused by the elasticity of the hoses, resulting in a high speed movement and improved positioning accuracy.

Obviously, numerous modifications and variations of the present invention are possible in light of the above teachings. It is therefore to be understood that within the scope of the appended claims, the present invention may be practiced otherwise than as specifically described herein.

What is claimed is:

1. A feed mechanism wherein a sliding member is movably guided by guide surface formed on a guide base, and an additional actuator generating heat during operation and connected to a movable member to be moved is embedded in a front end of said sliding member, said feed mechanism comprising:

hydrostatic bearing means provided on said guide surfaces and each having pressure pockets to which pressurized fluid is fed to support said sliding member;

a cooling jacket at the periphery of said additional actuator and having an oil channel formed therein for removing heat generated by said additional actuator;

a cooling oil feeding channel formed in said sliding member to connect said hydrostatic bearing means and said oil channel of said cooling jacket; and a cooling oil discharge channel formed in said sliding member to connect said oil channel of said cooling jacket and a space whose pressure is lower than that in said oil channel.

2. A feed mechanism according to claim 1, wherein said sliding member is a square sliding shaft with a square section, said guide base has four hydrostatic guide surfaces formed thereon which respectively support the four outer surfaces of said square sliding shaft, at least one of said guide surfaces has a pair of pressure pockets set apart in the moving direction of said square sliding shaft and a connecting channel in parallel to said moving direction of said sliding shaft to communicate said pressure pockets with an oil inlet channel which has an opening located approximately at the center of said at least one of guide surfaces, and said cooling oil feeding channel communicates with said connecting channel.

3. A feed mechanism according to claim 2, wherein said connecting channel communicating with said oil inlet channel comprises a deep groove having a length corresponding to the sliding range of said square sliding shaft, and a pair of throttle channels which connect said deep groove to said pair of pressure pockets, said cooling oil feeding channel being formed in a position to keep communication with said deep groove regardless of positional change of said square sliding shaft.

4. A feed mechanism according to claim 3, wherein said cooling jacket has a helical oil channel formed on its outer surface, said cooling oil feeding channel communicates with one end of said oil channel, and said cooling oil discharge channel communicates with the other end of said oil channel.

5. A feed mechanism according to claim 4, wherein said additional actuator is composed of a piezoelectric actuator.

6. A feed mechanism having;

a square sliding shaft having a square section;

a movable member disposed at a front end of said square sliding shaft for movement in a direction parallel to the longitudinal direction of said square sliding shaft;

an additional actuator embedded in the front end of said square sliding shaft to move said movable member with respect to said square sliding shaft, said additional actuator generating heat during operation;

a guide base having four guide surfaces formed thereon which respectively support the four outer surfaces of said square sliding shaft to movably support said square sliding shaft;

hydrostatic bearing means provided on at least one of said four guide surfaces;

an oil inlet channel communicating with said hydrostatic bearing to supply an oil thereto;

a cooling jacket provided at the periphery of said additional actuator and having an oil channel formed therein for removing heat generated by said additional actuator, wherein said square sliding shaft is formed with a cooling oil feeding channel connecting said hydrostatic bearing means and said oil channel of said cooling jacket, and a cooling oil discharge channel connecting said oil channel of said cooling jacket and a space whose pressure is lower than that in said oil channel; and said hydrostatic bearing means is composed of a pair of pressure pockets set apart in the moving direction of said square sliding shaft and a connecting channel parallel to said moving direction of said square sliding shaft to communicate said pressure pockets with said inlet channel, said connecting channel comprising a deep groove having a length corresponding to the sliding range of said square sliding shaft, and a pair of throttle channels which connect said deep groove to said pair of pressure pockets.

* * * * *

UNITED STATES PATENT AND TRADEMARK OFFICE
CERTIFICATE OF CORRECTION

PATENT NO. : 5,063,322

DATED : November 5, 1991

INVENTOR(S) : Kazuhiko Sugita et al.

It is certified that error appears in the above-identified patent and that said Letters Patent is hereby corrected as shown below:

Title page, item (75):

The second inventor's name is incorrect, should be,

--Nobumitsu Hori--.

Signed and Sealed this

Thirteenth Day of April, 1993

*Attest:*

STEPHEN G. KUNIN

*Attesting Officer*     *Acting Commissioner of Patents and Trademarks*